US011031622B2

(12) United States Patent
Wang et al.

(10) Patent No.: US 11,031,622 B2
(45) Date of Patent: Jun. 8, 2021

(54) LITHIUM-ION SECONDARY BATTERY

(71) Applicant: CONTEMPORARY AMPEREX TECHNOLOGY CO., LIMITED, Ningde (CN)

(72) Inventors: Qiaoge Wang, Ningde (CN); Shengwei Wang, Ningde (CN); Chuanmiao Yan, Ningde (CN); Fuping Luo, Ningde (CN); Yanyun Tan, Ningde (CN); Manfang Zhang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 127 days.

(21) Appl. No.: 16/443,455

(22) Filed: Jun. 17, 2019

(65) Prior Publication Data
US 2020/0014061 A1 Jan. 9, 2020

(30) Foreign Application Priority Data

Jul. 4, 2018 (CN) .......................... 201810724329.0

(51) Int. Cl.
H01M 10/0525 (2010.01)
H01M 4/505 (2010.01)
H01M 4/525 (2010.01)
H01M 4/587 (2010.01)
H01M 10/0566 (2010.01)
H01M 4/583 (2010.01)
H01M 4/133 (2010.01)
H01M 4/131 (2010.01)

(52) U.S. Cl.
CPC ....... *H01M 10/0525* (2013.01); *H01M 4/131* (2013.01); *H01M 4/133* (2013.01); *H01M 4/505* (2013.01); *H01M 4/525* (2013.01); *H01M 4/583* (2013.01); *H01M 4/587* (2013.01); *H01M 10/0566* (2013.01)

(58) Field of Classification Search
CPC ......... H01M 10/0525; H01M 10/0566; H01M 10/0568; H01M 10/0569; H01M 4/133; H01M 4/583; H01M 4/587; H01M 4/505; H01M 4/525
See application file for complete search history.

(56) References Cited

U.S. PATENT DOCUMENTS

| | | | |
|---|---|---|---|
| 2006/0068297 A1* | 3/2006 | Tan | H01M 10/0569 429/343 |
| 2006/0269844 A1 | 11/2006 | Deng et al. | |
| 2008/0182170 A1* | 7/2008 | Rong | H01M 4/131 429/223 |
| 2009/0023069 A1* | 1/2009 | Tian | C04B 35/62839 429/231.5 |
| 2009/0258296 A1 | 10/2009 | Kawasato et al. | |
| 2014/0099555 A1* | 4/2014 | Onizuka | H01M 4/0452 429/231.8 |
| 2014/0227588 A1 | 8/2014 | Kim et al. | |
| 2015/0194668 A1* | 7/2015 | Ueda | H01M 4/386 429/231.4 |
| 2018/0241086 A1* | 8/2018 | Arthur | H01M 10/0567 |

FOREIGN PATENT DOCUMENTS

CN 103035952 B 12/2016

OTHER PUBLICATIONS

Contemporary Amperex Technology Co., Limited, Extended European Search Report, EP19178036.0, dated Dec. 5, 2019, 8 pgs.

* cited by examiner

*Primary Examiner* — Gregg Cantelmo
(74) *Attorney, Agent, or Firm* — Morgan, Lewis & Bockius LLP

(57) ABSTRACT

The present disclosure provides a lithium-ion secondary battery, which comprises a positive electrode plate, a negative electrode plate, a separator and an electrolyte. The lithium-ion secondary battery satisfies a relationship: $1.5 \leq (m \times C)/(\rho \times Cap) \leq 6.5$. In the present disclosure, by comprehensively considering the rated capacity of the battery, the mass of the electrolyte and the intrinsic parameters of the electrolyte and reasonably quantifying the relationship thereof, the lithium-ion secondary battery can have good dynamics performance and longer cycle life at the same time.

15 Claims, No Drawings

LITHIUM-ION SECONDARY BATTERY

CROSS-REFERENCE TO RELATED APPLICATIONS

The present application claims priority to Chinese patent application No. CN201810724329.0, filed on Jul. 4, 2018, which is incorporated herein by reference in its entirety.

FIELD OF THE PRESENT DISCLOSURE

The present disclosure relates to the field of battery, and particularly relates to a lithium-ion secondary battery.

BACKGROUND OF THE PRESENT DISCLOSURE

With the development of portable electronic products and new energy automotives, people have higher requirements on charging speed and service life of the portable electronic products and the new energy automotives, therefore a battery used thereof is required to have better rate performance and longer cycle life without compromising the capacity of the battery.

However, a passivation layer (known as solid electrolyte interface membrane, SEI membrane) coated on a surface of a negative active material is usually damaged during a large-rate charging and discharging process of the battery, and then a repair process of the SEI membrane will continually decrease the mass of the electrolyte inside the battery, which seriously affects the cycle life of the battery. Moreover, intrinsic parameters of the electrolyte also affect the rate performance of the battery.

SUMMARY OF THE PRESENT DISCLOSURE

In view of the problem existing in the background, an object of the present disclosure is to provide a lithium-ion secondary battery, which can make the lithium-ion secondary battery have good dynamics performance and longer cycle life at the same time.

In order to achieve the above object, the present disclosure provides a lithium-ion secondary battery, which comprises a positive electrode plate, a negative electrode plate, a separator and an electrolyte, the electrolyte comprises a lithium salt and an organic solvent; the lithium-ion secondary battery satisfies a relationship: $1.5 \leq (m \times C)/(\rho \times Cap) \leq 6.5$, m represents a total mass of the electrolyte inside the formated battery with a unit of g, $\rho$ represents a density of the electrolyte with a unit of g/cm$^3$, C represents a concentration of the lithium salt in the electrolyte with a unit of mol/L, Cap represents a rated capacity of the battery with a unit of Ah.

The positive electrode plate comprises a positive current collector and a positive film, the positive film is provided on at least one surface of the positive current collector and comprises a positive active material, the positive active material comprises one or more selected from a group consisting of $Li_xNi_aCo_bM_cO_2$ and a doping and/or coating modified compound thereof, M is one or two selected from a group consisting of Mn and Al, $0.95 \leq x \leq 1.2$, $0 < a < 1$, $0 < b < 1$, $0 < c < 1$. The lithium-ion secondary battery satisfies a relationship: $1.5 \leq (m \times C)/(\rho \times Cap) \leq 3.5$. Preferably, the lithium-ion secondary battery satisfies a relationship: $1.8 \leq (m \times C)/(\rho \times Cap) \leq 3.0$. More preferably, the lithium-ion secondary battery satisfies a relationship: $2.13 \leq (m \times C)/(\rho \times Cap) \leq 2.63$.

Preferably, $a+b+c=1$.

The negative electrode plate comprises a negative current collector and a negative film, the negative film is provided on at least one surface of the negative current collector and comprises a negative active material, the negative active material at least comprises graphite.

The density of the electrolyte represented by $\rho$ is 1.0 g/cm$^3$~1.3 g/cm$^3$. Preferably, the density of the electrolyte represented by $\rho$ is 1.1 g/cm$^3$~1.25 g/cm$^3$.

The concentration of the lithium salt in the electrolyte represented by C is 0.6 mol/L~1.2 mol/L. Preferably, the concentration of the lithium salt in the electrolyte represented by C is 0.8 mol/L~1.17 mol/L.

m/Cap is 2 g/Ah~6 g/Ah. Preferably, m/Cap is 2 g/Ah~3.0 g/Ah.

A pressing density of the positive film is 3.3 g/cm$^3$~3.55 g/cm$^3$.

A coating weight per unit area on one surface of the negative film represented by CW is 0.006 g/cm$^2$~0.012 g/cm$^2$. Preferably, the coating weight per unit area on one surface of the negative film represented by CW is 0.007 g/cm$^2$~0.009 g/cm$^2$.

An OI value of the negative film represented by $V_{OI}$ is 11~30. Preferably, the OI value of the negative film represented by $V_{OI}$ is 14~30. More preferably, the OI value of the negative film represented by $V_{OI}$ is 16~30.

A pressing density of the negative film is 1.0 g/cm$^3$~1.6 g/cm$^3$.

An average particle diameter of the negative active material represented by D50 is 4 μm~15 μm.

Compared with the existing technologies, the present disclosure at least includes the following beneficial effects: in the present disclosure, by comprehensively considering the rated capacity of the battery, the mass of the electrolyte and the intrinsic parameters of the electrolyte and reasonably quantifying the relationship thereof, the lithium-ion secondary battery can have good dynamics performance and longer cycle life at the same time.

DETAILED DESCRIPTION

Hereinafter a lithium-ion secondary battery according to the present disclosure is described in detail.

The lithium-ion secondary battery of the present disclosure comprises a positive electrode plate, a negative electrode plate, a separator and an electrolyte, the electrolyte comprises a lithium salt and an organic solvent. The lithium-ion secondary battery satisfies a relationship: $1.5 \leq (m \times C)/(\rho \times Cap) \leq 6.5$, m represents a total mass of the electrolyte inside the formated battery with a unit of g, $\rho$ represents a density of the electrolyte with a unit of g/cm$^3$, C represents a concentration of the lithium salt in the electrolyte with a unit of mol/L, Cap represents a rated capacity of the battery with a unit of Ah.

It should be noted that, when a fully charged battery is discharged to a cut-off discharge voltage at room temperature and at a current of 1 $I_1$ (A), the obtained discharge capacity is the rated capacity of the battery represented by Cap, and $I_1$ represents one hour rate discharge current. The specific test method may refer to GB/T 31484-2015 cycle life requirements and test methods for traction battery of electric vehicles.

The lithium ions are deintercalated from the positive active material and then intercalated into the negative active material during the charging process of the battery, and the negative active material easily expands during the charging process to result in a damage to the SEI membrane on the surface of the negative active material, and the damage to the SEI membrane speeds up especially when the battery is charged under a large rate and a fast speed. In order to make the battery have longer cycle life, the repair of the SEI membrane needs to speed up, which requires that there is still enough electrolyte in the finally prepared battery. However, the amount of the electrolyte inside the finally prepared battery is not the more the better, and the more the amount of the electrolyte is, the less the free volume inside the battery is, the larger the internal pressure of the battery is when the same amount of gas is generated in the battery, the vent or the weak point on the case of the battery is more prone to burst early during the cycle process of the battery, thereby resulting in failure of the battery. Furthermore, the excessive electrolyte inside the battery will make the gas production of the battery be too large, a large amount of bubbled dark spots are prone to form on the surface of the negative electrode plate, thereby deteriorating the cycle performance and the dynamics performance of the battery.

The lithium salt in the electrolyte is the transmission unit of the lithium ions, the value of the concentration of the lithium salt in the electrolyte directly affects the transmission speed of the lithium ions, and the transmission speed of the lithium ions in turn affects the potential of the negative electrode plate. When the battery is charged under a fast speed, the transmission speed of the lithium ions needs to be as high as possible so as to prevent the lithium dendrite from forming due to too fast decrease of the potential of the negative electrode plate and in turn bringing safety hazard to the battery, and also prevent the capacity of the battery from decaying too fast during the cycle process.

When the density of the electrolyte is too small, the concentration of the lithium salt in the electrolyte may be too small or the density of the organic solvent may be too small. If the concentration of the lithium salt in the electrolyte is too small, there are not enough transmission units of the lithium ions inside the battery, the potential of the negative electrode plate decreases too fast when the battery is charged under a large rate, therefore the lithium dendrite is easily formed on the surface of the negative electrode plate to consume the reversible active lithium; and moreover, the lithium dendrite with the continual growth may also puncture the separator to make the positive electrode plate and the negative electrode plate short-circuited and bring safety hazard to the battery. The lithium salt with a too low concentration will also make the SEI membrane on the negative electrode plate be not stable, therefore the SEI membrane is easily decomposed and then repaired to form into a secondary SEI membrane, and the decomposition of the secondary SEI membrane is more serious under a high temperature; and moreover, a large amount of heat is generated during the decomposition process and the repair process of the SEI membrane, which deteriorates the surface of the negative electrode plate and further deteriorates the cycle performance of the battery. When the density of the organic solvent is too small, a dielectric constant of the electrolyte is lower, which may increase the transmission resistance of the lithium ions.

When the density of the electrolyte is too large, the concentration of the lithium salt in the electrolyte may be too large or the density of the organic solvent may be too large, because the lithium salt is easily decomposed to generate heat under a high temperature, the lithium salt with a larger concentration will aggravate the heat generation inside the battery, and there is easily failure of the battery. When the density of the electrolyte is too large, the viscosity of the electrolyte is prone to be too large, the transmission resistance of the lithium ions increases, thereby affecting the dynamics performance of the battery; and moreover, when the density of the electrolyte is too large, the polarization of the battery is prone to increase, thereby deteriorating the cycle performance of the battery.

When the lithium-ion secondary battery is designed, the applicant has comprehensively considered all the factors above and has done a large number of researches, finally the applicant found that when the lithium-ion secondary battery satisfies a relationship $1.5 \leq (m \times C)/(\rho \times Cap) \leq 6.5$, the lithium-ion secondary can have good dynamics performance and longer cycle life at the same time.

When the value of $(m \times C)/(\rho \times Cap)$ is less than 1.5, the total mass of the electrolyte inside the formated battery represented by m is too small or the concentration of the lithium salt in the electrolyte represented by C is too small, both the long-term cycle performance and the dynamics performance of the battery are significantly affected. When the total mass of the electrolyte inside the formated battery represented by m is too small, there will be not enough electrolyte to be consumed during the long-term cycle process, the stability and the compactness of the SEI membrane on the surface of the negative active material are bad, the dynamics performance of the battery is decreased, and the cycle performance of the battery is also deteriorated. When the concentration of the lithium salt in the electrolyte represented by C is too small, there are not enough transmission units of the lithium ions inside the battery, the potential of the negative electrode plate decreases too fast when the battery is charged under a large rate, therefore the lithium dendrite is easily formed on the surface of the negative electrode plate to consume the reversible active lithium; and moreover, the lithium dendrite with the continual growth may also puncture the separator to make the positive electrode plate and the negative electrode plate short-circuited and bring safety hazard to the battery. The lithium salt with a too low concentration C will also make the SEI membrane on the negative electrode plate be not stable, therefore the SEI membrane is easily decomposed and then repaired to form into a secondary SEI membrane, and the decomposition of the secondary SEI membrane is more serious under a high temperature; and moreover, a large amount of heat is generated during the decomposition process and the repair process of the SEI membrane, which deteriorates the surface of the negative electrode plate and further deteriorates the cycle performance of the battery.

When the value of $(m \times C)/(\rho \times Cap)$ is more than 6.5, the total mass of the electrolyte inside the formated battery represented by m is too large or the concentration of the lithium salt in the electrolyte represented by C is too large, the cycle performance of the battery is also affected. The larger the total mass of the electrolyte inside the formated battery represented by m is, the less the free volume inside the battery is, the larger the internal pressure of the battery is when the same amount of gas is generated in the battery, the vent or the weak point on the case of the battery is more prone to burst early during the cycle process of the battery, thereby resulting in failure of the battery; and furthermore, the excessive electrolyte inside the formated battery will make the gas production of the battery be too large, a large amount of bubbled dark spots are prone to form on the surface of the negative electrode plate, thereby deteriorating the cycle performance and the dynamics performance of the battery. When the concentration of the lithium salt represented by C is too large, the lithium salt is easily decomposed to generate heat under a high temperature, which aggravates the heat generation inside the battery, thereby resulting in failure of the battery.

In the lithium-ion secondary battery of the present disclosure, preferably, the density of the electrolyte represented by $\rho$ is 1.0 g/cm$^3$~1.3 g/cm$^3$. More preferably, the density of the electrolyte represented by $\rho$ is 1.1 g/cm$^3$~1.25 g/cm$^3$.

In the lithium-ion secondary battery of the present disclosure, preferably, the concentration of the lithium salt in the electrolyte represented by C is 0.6 mol/L~1.2 mol/L. More preferably, the concentration of the lithium salt in the electrolyte represented by C is 0.8 mol/L~1.17 mol/L.

In the lithium-ion secondary battery of the present disclosure, preferably, m/Cap is 2 g/Ah~6 g/Ah. More preferably, m/Cap is 2.3 g/Ah~5.8 g/Ah.

In the lithium-ion secondary battery of the present disclosure, the positive electrode plate comprises a positive current collector and a positive film, the positive film is provided on at least one surface of the positive current collector and comprises a positive active material, a conductive agent and a binder. The types and the contents of the conductive agent and the binder are not specifically limited and may be selected based on actual demands. The type of the positive current collector is not specifically limited and may be selected based on actual demands, for example, the positive current collector may be an aluminum foil, a nickel foil or a polymer conductive film, and preferably, the positive current collector is the aluminum foil.

Preferably, the positive active material may be one or more selected from a group consisting of LiCoO$_2$, LiNiO$_2$, LiMnO$_2$, Li$_x$Ni$_a$Co$_b$M$_c$O$_2$ (M is one or two selected from a group consisting of Mn and Al, 0.95≤x≤1.2, 0<a<1, 0<b<1, 0<c<1 and a+b+c=1), LiFe$_{1-y}$Mn$_y$PO$_4$ (0≤y≤1), and a doping and/or coating modified compound thereof, but the present disclosure is not limited thereto, other conventionally known materials that can be used as the positive active material can also be used. These positive active materials may be used alone or may be used as two or more of them in combination. More preferably, the positive active material may be one or more selected from a group consisting of Li$_x$Ni$_a$Co$_b$M$_c$O$_2$ (M is one or two selected from a group consisting of Mn and Al, 0.95≤x≤1.2, 0<a<1, 0<b<1, 0<c<1 and a+b+c=1), LiFe$_{1-y}$Mn$_y$PO$_4$ (0≤y≤1), and a doping and/or coating modified compound thereof.

The doping element may be a cation, an anion or complex ions of an anion and a cation, the purpose of the doping modification is to dope some cations, anions or complex ions into the crystal lattice of the positive active material, it is beneficial for reducing the first cycle irreversible capacity, making the integrity of the crystal structure of the positive active material more complete, making the stability of the crystal structure of the positive active material higher, and making the probability of particle break and the probability of crystal structure damage lower, in turn it is beneficial for improving the cycle performance and thermal stability of the battery. The specific method of the doping modification is not limited, for example, a wet doping may be used in the coprecipitation stage of the precursor, or a dry doping may be used in the sintering stage. Preferably, the element used in the cation doping may be one or more selected from a group consisting of Al, Zr, Ti, B, Mg, V, Cr, Zn and Y; the element used in the anion doping may be one or more selected from a group consisting of F, P and S, F is more preferable. F may not only promote the sintering of the positive active material so as to make the crystal structure of the positive active material more stable, but also may stabilize the interface between the positive active material and the electrolyte during the cycle process, therefore it is beneficial for improving the cycle performance of the battery. Preferably, a total doping amount of the cations and the anions is not more than 20%.

The coating layer functions to separate the electrolyte and the positive active material so as to reduce the side reactions between the electrolyte and the positive active material to a large extent, reduce the dissolution of the transition metals inside the positive active material, and improve the electrochemical stability of the positive active material. The coating layer may be a carbon layer, a graphene layer, an oxide layer, an inorganic salt layer or a conductive polymer layer. Preferably, the oxide may be an oxide formed from one or more selected from a group consisting of Al, Ti, Mn, Zr, Mg, Zn, Ba, Mo and B; the inorganic salt may be one or more selected from a group consisting of Li$_2$ZrO$_3$, LiNbO$_3$, Li$_4$Ti$_5$O$_{12}$, Li$_2$TiO$_3$, Li$_3$VO$_4$, LiSnO$_3$, Li$_2$SiO$_3$ and LiAlO$_2$; the conductive polymer may be polypyrrole (PPy), poly(3, 4-ethylenedioxythiophene) (PEDOT) or polyamide (PI). Preferably, a mass of the coating layer is not more than 20%.

Preferably, Li$_x$Ni$_a$Co$_b$M$_c$O$_2$ may be one or more specifically selected from a group consisting of LiNi$_{1/3}$Co$_{1/3}$Mn$_{1/3}$O$_2$ (NCM333), LiNi$_{0.5}$Co$_{0.2}$Mn$_{0.3}$O$_2$ (NCM523), LiNi$_{0.6}$Co$_{0.2}$Mn$_{0.2}$O$_2$ (NCM622), LiNi$_{0.8}$Co$_{0.1}$Mn$_{0.1}$O$_2$ (NCM811), LiNi$_{0.8}$Co$_{0.1}$Al$_{0.1}$O$_2$ and LiNi$_{0.85}$Co$_{0.15}$Al$_{0.05}$O$_2$.

Preferably, LiFe$_{1-y}$Mn$_y$PO$_4$ (0≤y≤1) may be one or more specifically selected from a group consisting of LiFePO$_4$ (LFP) and a composite of LiFePO$_4$ and a carbon material.

In the lithium-ion secondary battery of the present disclosure, when the types of the positive active materials are different, the preferred range of (m×C)/(ρ×Cap) also varies when the battery is designed, this is mainly because the pressing densities of the specific kinds of the positive active materials are different, and the larger the pressing density is, the more closely the positive active material particles are stacked, the lower the porosity of the positive electrode plate under the same volume is, the less the total mass of the electrolyte absorbed by the positive electrode plate via the pores in the positive electrode plate is, the smaller the value of (m×c)/(ρ×Cap) is; and vice versa.

Preferably, when the positive active material is one or more selected from a group consisting of Li$_x$Ni$_a$Co$_b$M$_c$O$_2$ (M is one or two selected from a group consisting of Mn and Al, 0.95≤x≤1.2, 0<a<1, 0<b<1, 0<c<1 and a+b+c=1) and a doping and/or coating modified compound thereof, the lithium-ion secondary battery satisfies a relationship: 1.5≤(m×C)/(ρ×Cap)≤3.5. More preferably, the lithium-ion secondary battery satisfies a relationship: 1.8≤(m×C)/(ρ×Cap)≤3.0.

Preferably, when the positive active material is one or more selected from a group consisting of Li$_x$Ni$_a$Co$_b$M$_c$O$_2$ (M is one or two selected from a group consisting of Mn and Al, 0.95≤x≤1.2, 0<a<1, 0<b<1, 0<c<1 and a+b+c=1) and a doping and/or coating modified compound thereof, a pressing density of the positive film is 3.1 g/cm$^3$~4.2 g/cm$^3$, preferably, the pressing density of the positive film is 3.3 g/cm$^3$~4.0 g/cm$^3$; a porosity of the positive film is 10%~40%, preferably, the porosity of the positive film is 15%~30%.

Preferably, when the positive active material is one or more selected from a group consisting of LiFe$_{1-y}$Mn$_y$PO$_4$ (0≤y≤1) and a doping and/or coating modified compound thereof, the lithium-ion secondary battery satisfies a relationship: 3.5≤(m×C)/(ρ×Cap)≤6.5. More preferably, the lithium-ion secondary battery satisfies a relationship: 4.0≤(m×C)/(ρ×Cap)≤5.5.

Preferably, when the positive active material is one or more selected from a group consisting of $LiFe_{1-y}Mn_yPO_4$ (0≤y≤1) and a doping and/or coating modified compound thereof, a pressing density of the positive film is 2.0 g/cm³~2.6 g/cm³, preferably, the pressing density of the positive film is 2.2 g/cm³~2.4 g/cm³; a porosity of the positive film is 20%~45%, preferably, the porosity of the positive film is 30%~40%.

In the lithium-ion secondary battery of the present disclosure, the negative electrode plate comprises a negative current collector and a negative film, the negative film is provided on at least one surface of the negative current collector and comprises a negative active material, a conductive agent and a binder. The types and the contents of the conductive agent and the binder are not specifically limited and may be selected based on actual demands. The type of the negative current collector is not specifically limited and may be selected based on actual demands, for example, the negative current collector may be a copper foil, a carbon coated copper foil or a polymer conductive film, and preferably, the negative current collector is the copper foil The negative active material may be one or more selected from a group consisting of graphite, soft carbon, hard carbon, carbon fiber, mesocarbon microbeads, silicon-based material, tin-based material and lithium titanate. The graphite is artificial graphite, natural graphite or a mixture thereof; the silicon-based material may be one or more selected from a group consisting of elemental silicon, silicon oxide, silicon carbon composite and silicon alloy; the tin-based material is one or more selected from a group consisting of elemental tin, tin oxide compound and tin alloy.

In order to further improve the energy density and the dynamics performance of the lithium-ion secondary battery, preferably, the negative active material at least comprises graphite, and the lithium-ion secondary battery further satisfies a relationship: $0.01 \leq CW \times V_{OI} \leq 0.25$. CW represents a coating weight per unit area on one surface of the negative film with a unit of g/cm²; $V_{OI}$ represents an OI value of the negative film.

The OI value of the negative film is defined as $V_{OI}=C_{004}/C_{110}$, $C_{004}$ represents a characteristic diffraction peak area of (004) crystal plane in X-ray diffraction pattern of the negative electrode plate, $C_{110}$ represents a characteristic diffraction peak area of (110) crystal plane in X-ray diffraction pattern of the negative electrode plate.

The OI value of the negative film may be obtained by a X-ray powder diffractometer (X'pert PRO), a X-ray diffraction pattern is obtained according to the general rules for X-ray diffractometric analysis JIS K 0131-1996 and the determination method of artificial graphite lattice parameter JB/T4220-2011, the OI value is obtained according to an equation $V_{OI}=C_{004}/C_{110}$, $C_{004}$ represents characteristic diffraction peak area of (004) crystal plane, $C_{110}$ represents characteristic diffraction peak area of (110) crystal plane.

Preferably, the coating weight per unit area on one surface of the negative film represented by CW is 0.003 g/cm²~0.015 g/cm². More preferably, the coating weight per unit area on one surface of the negative film represented by CW is 0.006 g/cm²~0.012 g/cm².

Preferably, the OI value of the negative film represented by $V_{OI}$ is 3~40. More preferably, the OI value of the negative film represented by $V_{OI}$ is 5~30.

The smaller the coating weight per unit area on one surface of the negative film represented by CW is, the more easier the infiltration of the electrolyte to the negative film is, the better the dynamics performance of the negative film is, and vice versa. However, when the coating weight per unit area on one surface of the negative film represented by CW is too small, the energy density of the battery is directly affected, and it is also more difficult to control the coating process of the negative slurry. The smaller the OI value of the negative film represented by $V_{OI}$ is, the more beneficial for the transmission of the lithium ions is, but exfoliation of the negative film is prone to occur when the OI value of the negative film represented by $V_{OI}$ is too small. Therefore when both the coating weight per unit area on one surface of the negative film and the OI value of the negative film fall within the above preferred ranges thereof, the battery may have better dynamics performance and higher energy density at the same time.

It should be noted that, an OI value of a powder of the negative active material and a particle diameter of the negative active material both will affect the OI value of the negative film, therefore the OI value of the negative film can be adjusted by selecting an appropriate negative active material.

Preferably, the OI value of the powder of the negative active material represented by $G_{OI}$ is 2~15. More preferably, the OI value of the powder of the negative active material represented by $G_{OI}$ is 2~11. When the OI value of the powder of the negative active material falls within the above preferred ranges thereof, the negative active material can have better isotropy, which is more beneficial for the deintercalation and the intercalation of the lithium ions. The OI value of the powder of the negative active material may be obtained by a X-ray powder diffractometer (X'pert PRO), a X-ray diffraction pattern is obtained according to the general rules for X-ray diffractometric analysis JIS K 0131-1996 and the determination method of artificial graphite lattice parameter JB/T4220-2011, the OI value is obtained according to an equation $G_{OI}=C_{004}/C_{110}$, $C_{004}$ represents characteristic diffraction peak area of (004) crystal plane of the negative active material, $C_{110}$ represents characteristic diffraction peak area of (110) crystal plane of the negative active material. A certain mass of the powder of the negative active material may be directly placed in the X-ray powder diffractometer during the test process.

Preferably, the average particle diameter of the negative active material represented by D50 is 1 μm~25 μm. More preferably, the average particle diameter of the negative active material represented by D50 is 4 μm~15 μm. When the particle diameter of the negative active material falls within the above preferred ranges thereof, the negative film can have better homogeneity, thereby avoiding the negative active material with too small particle diameter from affecting the performances of the battery by generating more side reactions with the electrolyte, and also avoiding the negative active material with too large particle diameter from affecting the performances of the battery by hindering the transmission of the lithium ions inside the negative active material.

Cold pressing parameters (such as cold pressing speed, cold pressing temperature, cold pressing pressure, cold pressing times and the like) of the negative electrode plate will also affect the orientation degree of the stacked negative active material particles in the negative film and in turn affect the OI value of the negative film, therefore the OI value of the negative film can also be adjusted by controlling the cold pressing parameters of the negative electrode plate.

Preferably, a pressing density of the negative film is 0.8 g/cm³~2.0 g/cm³. More preferably, the pressing density of the negative film is 1.0 g/cm³~1.6 g/cm³. When the pressing density of the negative film falls within the above preferred ranges thereof, the integrity of the negative active material particle is higher, and the electrical contact between the negative active material particles is better.

Furthermore, the OI value of the negative film can also be adjusted by using magnetic field inducing technique during the coating process of the negative slurry. The direction of the magnetic field and the value of the magnetic field can be reasonably adjusted according to the required OI value of the negative film.

In the lithium-ion secondary battery of the present disclosure, the type of the separator is not specifically limited, and the separator may be any separator used in existing batteries, for example, the separator may be a polyethylene membrane, polypropylene membrane, a polyvinylidene fluoride membrane and a multilayer composite membrane thereof, but the present disclosure is not limited thereto.

In the lithium-ion secondary battery of the present disclosure, the specific types and the specific components of the lithium salt and the organic solvent are not specifically limited and may be selected based on actual demands.

Preferably, the lithium salt may be one or more selected from a group consisting of lithium hexafluorophosphate, lithium tetrafluoroborate, lithium perchlorate, lithium hexafluoroarsenate, lithium tetrafluoro(oxalato)phosphate, $LiN(SO_2R_F)_2$, $LiN(SO_2F)(SO_2R_F)$, lithium bis(trifluoromethanesulfonyl)imide, lithium bis(fluorosulfonyl)imide, lithium bis(oxalato)borate and lithium difluoro(oxalato)borate, the substituent $R_F$ is characterized by $C_nF_{2n+1}$, n is integer of 1~10.

Preferably, the organic solvent may comprise one or more selected from a group consisting of cyclic carbonate, chain carbonate and carboxylic ester. The cyclic carbonate may be one or more selected from a group consisting of ethylene carbonate, propylene carbonate, butylene carbonate and γ-butyrolactone; the chain carbonate may be one or more selected from a group consisting of dimethly carbonate, diethyl carbonate, ethyl methyl carbonate and ethyl propyl carbonate; the carboxylic ester may be one or more selected from a group consisting of methyl formate, ethyl formate, methyl acetate, ethyl acetate, propyl propionate, ethyl butyrate, ethyl propionate and propyl butyrate. The electrolyte may further comprise functional additives, such as vinylene carbonate, ethylene sulfate, propane sultone, fluoroethylene carbonate and the like.

The lithium-ion secondary battery of the present disclosure can be prepared according to methods known in the art, the parameters of the present disclosure need to be considered before the battery is prepared, for example, a part of the electrolyte is consumed in the formation process of the battery, therefore the initial mass of the electrolyte needs to be calculated based on experience in order to make the total mass of the electrolyte inside the formated battery meet the requirements, the initial mass of the electrolyte=the total mass of the electrolyte inside the formated battery+the mass of the electrolyte consumed in the formation process. In the lithium-ion secondary battery of the present disclosure, the mass of the electrolyte consumed in the formation process is 0.1 g/Ah~0.3 g/Ah.

Hereinafter the present disclosure will be described in detail in combination with examples. It should be noted that, the examples described in the present disclosure are only used for explaining the present disclosure, and are not intended to limit the scope of the present disclosure.

Example 1

(1) Preparation of an Electrode Assembly

A rated capacity of the electrode assembly represented by Cap was 50 Ah.

$LiNi_{0.5}Co_{0.2}Mn_{0.3}O_2$ (positive active material), acetylene black (conductive agent) and PVDF (binder) according to a mass ratio of 96:2:2 were uniformly mixed with NMP (solvent), which then became homogeneous under stirring via a vacuum mixer, a positive slurry was obtained; then the positive slurry was uniformly coated on aluminum foil (positive current collector), drying was then performed under room temperature and continual drying was performed in an oven, which was then followed by cold pressing and plate cutting, finally the positive electrode plate was obtained. A pressing density of the positive film was 4.0 g/cm$^3$, a porosity of the positive film was 12%.

Graphite (negative active material), acetylene black (conductive agent), CMC (thickening agent) and SBR (binder) according to a mass ratio of 96.4:1:1.2:1.4 were uniformly mixed with deionized water (solvent), which then became homogeneous under stirring via a vacuum mixer, a negative slurry was obtained; then the negative slurry was uniformly coated on copper foil (negative current collector), a coating weight per unit area on one surface was 0.011 g/cm$^2$, drying was then performed under room temperature and continual drying was performed in an oven, which was then followed by cold pressing and plate cutting, finally the negative electrode plate was obtained. An OI value of the negative film was 25.

The positive electrode plate, the separator (polyethylene membrane) and the negative electrode plate were laminated in order, the separator was positioned between the positive electrode plate and the negative electrode plate so as to separate the positive electrode plate from the negative electrode plate, then the positive electrode plate, the separator and the negative electrode plate were wound together to form an electrode assembly.

(2) Preparation of an Electrolyte

Ethylene carbonate, ethyl methyl carbonate and diethyl carbonate according to a volume ratio of 1:1:1 were mixed together to obtain an organic solvent, then sufficiently dried $LiPF_6$ was dissolved into the mixed organic solvent to obtain an electrolyte, a concentration of the electrolyte represented by C was 0.8 mol/L, a density of the electrolyte represented by ρ was 1.1 g/cm$^3$.

(3) Preparation of a Lithium-Ion Secondary Battery

The electrode assembly was put into a case, which was followed by baking, injecting 112 g electrolyte, vacuum packaging, standby, formation (the mass of the electrolyte consumed in the formation process was 0.15 g/Ah), shaping and the like, finally a lithium-ion secondary battery was obtained.

Preparation of examples 2-13 and comparative examples 1-4 was the same as that in example 1, and the specific differences were shown in Table 1. And in the preparation of the negative electrode plate, after an appropriate negative active material was selected, the negative film having different OI values could be obtained by reasonably adjusting the cold pressing parameters or additionally using the magnetic field inducing technique, the direction of the magnetic field and the value of the magnetic field could be reasonably adjusted according to the required OI value.

Hereinafter test processes of the lithium-ion secondary batteries were described.

(1) Test of the Dynamics Performance

At 25° C., the lithium-ion secondary batteries prepared in the examples and the comparative examples were fully charged at a constant current of 4 C and fully discharged at a constant current of 1 C for 10 cycles, then the lithium-ion secondary batteries were fully charged at a constant current of 4 C, then the negative electrode plates were disassembled from the lithium-ion secondary batteries, and the lithium precipitation on the surface of each negative electrode plate was observed. The lithium-precipitation area of less than 5% was considered to be slight lithium precipitation, the lithium-precipitation area of 5% to 40% was considered to be moderate lithium precipitation, and the lithium-precipitation area of more than 40% was considered to be serious lithium precipitation.

(2) Test of the Cycle Performance

At 25° C., the lithium-ion secondary batteries prepared in the examples and the comparative examples were charged at a constant current of 3 C and discharged at a constant current of 1 C, the fully charging and discharging process was repeated until the capacity of the lithium-ion secondary battery decayed to 80% of the initial capacity, and the cycle number of the lithium-ion secondary battery was recorded.

Table 1 illustrated the parameters of examples 1-13 and comparative examples 1-4. Table 2 illustrated the test results of examples 1-13 and comparative examples 1-4.

TABLE 2

Test results of examples 1-13 and comparative examples 1-4

| | Cycle number | Dynamics performance |
|---|---|---|
| Example 1 | 1500 | slight lithium precipitation |
| Example 2 | 2000 | no lithium precipitation |
| Example 3 | 2800 | no lithium precipitation |
| Example 4 | 3000 | no lithium precipitation |
| Example 5 | 2200 | no lithium precipitation |
| Example 6 | 1800 | slight lithium precipitation |
| Example 7 | 1500 | no lithium precipitation |
| Example 8 | 3500 | no lithium precipitation |
| Example 9 | 5000 | no lithium precipitation |
| Example 10 | 6800 | no lithium precipitation |
| Example 11 | 4300 | no lithium precipitation |
| Example 12 | 4000 | no lithium precipitation |
| Example 13 | 3400 | no lithium precipitation |
| Comparative example 1 | 400 | serious lithium precipitation |
| Comparative example 2 | 700 | moderate lithium precipitation |
| Comparative example 3 | 2000 | moderate lithium precipitation |
| Comparative example 4 | 800 | serious lithium precipitation |

When the lithium-ion secondary battery of the present disclosure was designed, by comprehensively considering the rated capacity of the battery, the mass of the electrolyte inside the formated battery and the intrinsic parameters of the electrolyte, the lithium-ion secondary battery could have good dynamics performance and longer cycle life at the same time.

TABLE 1

Parameters of examples 1-13 and comparative examples 1-4

| | Positive electrode plate | | | Negative electrode plate | | | Rated capacity of battery Cap (Ah) | Electrolyte | | | | | |
|---|---|---|---|---|---|---|---|---|---|---|---|---|---|
| | Positive active material | Pressing density of positive film (g/cm³) | Porosity of positive film | Negative active material | Coating weight CW (g/cm²) | OI value of negative film $V_{OI}$ | | Total mass of injected electrolyte (g) | Total mass of electrolyte inside formated battery m (g) | Density of electrolyte ρ (g/cm³) | Concentration of lithium salt C (mol/L) | m/Cap | (m × C)/(ρ × Cap) |
| Example 1 | NCM 523 | 4 | 12% | graphite | 0.011 | 25 | 50 | 112 | 105 | 1.1 | 0.8 | 2.1 | 1.52 |
| Example 2 | NCM 523 | 3.9 | 17% | graphite | 0.01 | 14 | 75 | 175 | 164 | 1.13 | 0.9 | 2.2 | 1.74 |
| Example 3 | NCM 523 | 3.7 | 20% | graphite | 0.095 | 18 | 66 | 175 | 165 | 1.14 | 0.97 | 2.5 | 2.13 |
| Example 4 | NCM 523 | 3.55 | 25% | graphite | 0.086 | 16 | 108 | 300 | 287 | 1.15 | 1.14 | 2.7 | 2.63 |
| Example 5 | NCM 523 | 3.52 | 25% | graphite | 0.008 | 11 | 43 | 135 | 130 | 1.17 | 1.16 | 3.0 | 2.99 |
| Example 6 | NCM 523 | 3.5 | 28% | graphite | 0.009 | 7 | 125 | 450 | 431 | 1.25 | 1.2 | 3.5 | 3.31 |
| Example 7 | NCM 523 | 3.2 | 30% | graphite | 0.007 | 13 | 200 | 740 | 710 | 1.22 | 1.2 | 3.6 | 3.49 |
| Example 8 | LFP | 2.5 | 31% | graphite | 0.014 | 27 | 37 | 190 | 186 | 1.1 | 0.8 | 5.0 | 3.66 |
| Example 9 | LFP | 2.4 | 33% | graphite | 0.012 | 20 | 43 | 250 | 246 | 1.13 | 0.9 | 5.7 | 4.55 |
| Example 10 | LFP | 2.35 | 35% | graphite | 0.009 | 12 | 51 | 230 | 220 | 1.13 | 0.95 | 4.3 | 3.62 |
| Example 11 | LFP | 2.3 | 38% | graphite | 0.007 | 18 | 68 | 320 | 310 | 1.17 | 1.16 | 4.6 | 4.52 |
| Example 12 | LFP | 2.25 | 40% | graphite | 0.006 | 14 | 72 | 390 | 372 | 1.22 | 1.19 | 5.2 | 5.04 |
| Example 13 | LFP | 2.1 | 42% | graphite | 0.004 | 5 | 102 | 630 | 605 | 1.23 | 1.2 | 5.9 | 5.78 |
| Comparative example 1 | NCM 523 | 3.5 | 28% | graphite | 0.009 | 7 | 125 | 500 | 481 | 1.25 | 1.2 | 3.9 | 3.70 |
| Comparative example 2 | NCM 523 | 3.2 | 30% | graphite | 0.007 | 13 | 200 | 740 | 710 | 1.35 | 1.4 | 3.6 | 3.68 |
| Comparative example 3 | LFP | 2.35 | 35% | graphite | 0.009 | 12 | 51 | 200 | 190 | 1.13 | 0.95 | 3.7 | 3.13 |
| Comparative example 4 | LFP | 2.5 | 31% | graphite | 0.014 | 27 | 37 | 190 | 186 | 0.95 | 0.58 | 5.0 | 3.07 |

The positive active material used in examples 1-7 was NCM523, when the lithium-ion secondary battery satisfied a relationship 1.5≤(m×C)/(ρ×Cap)≤3.5, the lithium-ion secondary battery had good dynamics performance and longer cycle life at the same time. In comparative example 1 and comparative example 2, the injected electrolyte was too much or the concentration of the lithium salt in the electrolyte was larger to make the value of (m×C)/(ρ×Cap) be larger, both the dynamics performance and the cycle life of the lithium-ion secondary battery were very bad. This was because, the more the injected electrolyte was, the larger the total mass of the electrolyte inside the formated battery was, the smaller the free volume inside the battery was, the larger the gas production in the battery was, the larger the internal pressure of the battery was, the vent or the weak point on the case of the battery was more prone to burst early during the cycle process of the battery, thereby resulting in failure of the battery. And moreover, the excessive electrolyte inside the formated battery also made the gas production in the battery increase, a large amount of bubbled dark spots were prone to form on the surface of the negative electrode plate, thereby also deteriorating the cycle performance and the dynamics performance of the battery. When the concentration of the lithium salt was larger, the lithium salt was more easily decomposed to generate heat under a high temperature, which also aggravated the heat generation inside the battery, thereby also resulting in failure of the battery during the cycle process; and moreover, the viscosity of the electrolyte was also larger, the transmission resistance of the lithium ions increased, thereby also affecting the dynamics performance of the battery.

The positive active material used in examples 8-13 was LFP, when the lithium-ion secondary battery satisfied a relationship 3.5≤(m×C)/(ρ×Cap)≤6.5, the lithium-ion secondary battery had good dynamics performance and longer cycle life at the same time. In comparative example 3 and comparative example 4, the injected electrolyte was too less or the concentration of the lithium salt in the electrolyte was smaller to make the value of (m×C)/(ρ×Cap) be smaller, both the dynamics performance and the cycle life of the lithium-ion secondary battery were very bad. This was because, when the injected electrolyte was too less, the total mass of the electrolyte inside the formated battery was smaller, the total mass of the lithium salt was not enough when the electrolyte was consumed during the long-term cycle process, the stability and the compactness of the SEI membrane on the surface of the negative active material were bad, the dynamics performance of the battery was decreased, and the cycle performance of the battery was also deteriorated. When the concentration of the lithium salt was smaller, there were not enough transmission units of the lithium ions inside the battery, the potential of the negative electrode plate decreased too fast when the battery was charged under a large rate, therefore the lithium dendrite was easily formed on the surface of the negative electrode plate to consume the reversible active lithium; and moreover, when the concentration of the lithium salt was smaller, the SEI membrane on the negative electrode plate was not stable, the SEI membrane was easily decomposed and then repaired to form into a secondary SEI membrane, and the decomposition of the secondary SEI membrane was more serious under a high temperature; furthermore, a large amount of heat was generated during the decomposition process and the repair process of the SEI membrane, which deteriorated the surface of the negative electrode plate and further deteriorated the cycle performance of the lithium-ion secondary battery.

What is claimed:

1. A lithium-ion secondary battery comprising a positive electrode plate, a negative electrode plate, a separator and an electrolyte, the electrolyte comprising a lithium salt and an organic solvent;
   wherein
   the lithium-ion secondary battery satisfies a relationship: 2.13≤(m×C)/(ρ×Cap)<2.63, m represents a total mass of the electrolyte inside the lithium-ion secondary battery with a unit of g, ρ represents a density of the electrolyte with a unit of $g/cm^3$, C represents a concentration of the lithium salt in the electrolyte with a unit of mol/L, Cap represents a rated capacity of the lithium-ion secondary battery with a unit of Ah,
   the positive electrode plate comprises a positive current collector and a positive film, the positive film is provided on at least one surface of the positive current collector and comprises a positive active material, the positive active material comprises one or more selected from the group consisting of $Li_xNi_aCo_bM_cO_2$ and a doping and/or coating modified compound thereof, M is one or two selected from the group consisting of Mn and Al, 0.95≤x≤1.2, 0<a<1, 0<b<1, 0<c<1, and
   the density of the electrolyte represented by ρ is 1.1 $g/cm^3$-1.25 $g/cm^3$.

2. The lithium-ion secondary battery according to claim 1, wherein the negative electrode plate comprises a negative current collector and a negative film, the negative film is provided on at least one surface of the negative current collector and comprises a negative active material, the negative active material at least comprises graphite.

3. The lithium-ion secondary battery according to claim 2, wherein a coating weight of the negative film per unit area on one surface of the negative current collector represented by CW is 0.006 $g/cm^2$-0.012 $g/cm^2$.

4. The lithium-ion secondary battery according to claim 3, wherein the coating weight of the negative film per unit area on one surface of the negative current collector represented by CW is 0.007 $g/cm^2$-0.009 $g/cm^2$.

5. The lithium-ion secondary battery according to claim 2, wherein an OI value of the negative film represented by $V_{OI}$ is 11-30,
   wherein
   $V_{OI}=C_{004}/C_{110}$,
   $C_{004}$ represents a characteristic diffraction peak area of (004) crystal plane in X-ray diffraction pattern of the negative film, and
   $C_{110}$ represents a characteristic diffraction peak area of (110) crystal plane in X-ray diffraction pattern of the negative film.

6. The lithium-ion secondary battery according to claim 5, wherein the OI value of the negative film represented by $V_{OI}$ is 14-30.

7. The lithium-ion secondary battery according to claim 6, wherein the OI value of the negative film represented by $V_{OI}$ is 16-30.

8. The lithium-ion secondary battery according to claim 2, wherein a pressing density of the negative film is 1.0 $g/cm^3$-1.6 $g/cm^3$.

9. The lithium-ion secondary battery according to claim 2, wherein an average particle diameter of the negative active material represented by D50 is 4 μm-15 μm.

10. The lithium-ion secondary battery according to claim 1, wherein the concentration of the lithium salt in the electrolyte represented by C is 0.6 mol/L-1.2 mol/L.

11. The lithium-ion secondary battery according to claim 10, wherein the concentration of the lithium salt in the electrolyte represented by C is 0.8 mol/L-1.17 mol/L.

12. The lithium-ion secondary battery according to claim 1, wherein m/Cap is 2 g/Ah-6 g/Ah.

13. The lithium-ion secondary battery according to claim 12, wherein m/Cap is 2 g/Ah-3.0 g/Ah.

14. The lithium-ion secondary battery according to claim 1, wherein a pressing density of the positive film is 3.3 g/cm$^3$-3.55 g/cm$^3$.

15. The lithium-ion secondary battery according to claim 1, wherein a+b+c=1.

\* \* \* \* \*